US010928899B2

United States Patent
Krishnakumar et al.

(10) Patent No.: US 10,928,899 B2
(45) Date of Patent: Feb. 23, 2021

(54) HANDLING MULTIPLE EYE-GAZE TRACKING (EGT) SOURCES IN VIRTUAL, AUGMENTED, OR MIXED REALITY (XR) APPLICATIONS

(71) Applicant: Dell Products, L.P., Round Rock, TX (US)

(72) Inventors: Karthikeyan Krishnakumar, Austin, TX (US); Vivek Viswanatha Iyer, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 15 days.

(21) Appl. No.: 16/246,131

(22) Filed: Jan. 11, 2019

(65) Prior Publication Data

US 2020/0225742 A1    Jul. 16, 2020

(51) Int. Cl.
  *G06T 19/00*  (2011.01)
  *G06F 3/01*  (2006.01)
  *H04N 5/235*  (2006.01)
  *G02B 27/01*  (2006.01)

(52) U.S. Cl.
  CPC ........... *G06F 3/013* (2013.01); *G02B 27/017* (2013.01); *G06F 3/012* (2013.01); *G06F 3/017* (2013.01); *G06T 19/006* (2013.01); *H04N 5/2351* (2013.01)

(58) Field of Classification Search
  CPC .......... G06F 3/013; G06F 3/012; G06F 3/017; G02B 27/017; G06T 19/003; G06T 19/006; G06T 3/4038; H04N 5/2351
  See application file for complete search history.

(56) References Cited

U.S. PATENT DOCUMENTS

| 9,442,564 | B1 * | 9/2016 | Dillon | G06F 3/012 |
| 10,389,996 | B1 * | 8/2019 | Mercier | H04N 13/144 |
| 2015/0199019 | A1 * | 7/2015 | Steers | G06F 3/017 348/148 |
| 2016/0004303 | A1 * | 1/2016 | Arar | G06F 3/013 345/156 |
| 2016/0034029 | A1 * | 2/2016 | Lyons | G06F 3/013 715/748 |

OTHER PUBLICATIONS

Sensics, "How Does Eye Tracking Work?," Jun. 11, 2017, 3 pages, retrieved Oct. 18, 2018, available at http://sensics.com/eye-tracking-work/.

(Continued)

*Primary Examiner* — Rinna Yi
(74) *Attorney, Agent, or Firm* — Fogarty LLP

(57) ABSTRACT

Embodiments of systems and methods for handling multiple Eye-Gaze Tracking (EGT) sources in virtual, augmented, or mixed reality (xR) applications are described. In some embodiments, an Information Handling System (IHS) may include a processor and a memory coupled to the processor, the memory having program instructions stored thereon that, upon execution by the processor, cause the IHS to: receive a first EGT vector from a first EGT system and a second EGT vector from a second EGT system; calculate a composite EGT vector using a first weight associated with the first EGT system and a second weight associated with the second EGT system; and render an image, in part, based upon the composite EGT vector.

15 Claims, 8 Drawing Sheets

(56) References Cited

OTHER PUBLICATIONS

The Verge, "Acer's new gaming monitors have built-in Tobii eye-tracking," Aug. 31, 2016, 5 pages, retrieved Oct. 18, 2018, available at https://www.theverge.com/circuitbreaker/2016/8/31/12718056/acer-predator-curved-gaming-monitor-tobii-eye-tracking-ifa-2016.

Tech Talk, "How eye tracking will enhance the AR and VR experience," Jun. 11, 2018, 10 pages, retrieved Oct. 18, 2018, available at https://bdtechtalks.com/2018/06/11/ar-vr-eye-tracking-foveated-rendering/.

Pupil Labs, "Open source eye tracking," 7 pages, retrieved Oct. 18, 2018, available at https://pupil-labs.com/.

* cited by examiner

HANDLING MULTIPLE EYE-GAZE TRACKING (EGT) SOURCES IN VIRTUAL, AUGMENTED, OR MIXED REALITY (XR) APPLICATIONS

FIELD

The present disclosure generally relates to Information Handling Systems (IHSs), and, more particularly, to systems and methods for handling multiple Eye-Gaze Tracking (EGT) sources in virtual, augmented, or mixed reality (xR) applications.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

IHSs may be used to produce virtual, augmented, or mixed reality (xR) applications. The goal of virtual reality (VR) is to immerse users in virtual environments. A conventional VR device obscures a user's real-world surroundings, such that only digitally-generated images remain visible. In contrast, augmented reality (AR) and mixed reality (MR) operate by overlaying digitally-generated content or entities (e.g., characters, text, hyperlinks, images, graphics, etc.) upon the user's real-world, physical surroundings. A typical AR/MR device includes a projection-based optical system that displays content on a translucent or transparent surface of an HMD, heads-up display (HUD), eyeglasses, or the like (collectively "HMDs").

In various implementations, HMDs may be tethered to an external or host IHS. Most HMDs do not have as much processing capability as the host IHS, so the host IHS is used to generate the digital images to be displayed by the HMD. The HMD transmits information to the host IHS regarding the state of the user, which in turn enables the host IHS to determine which image or frame to show to the user next, and from which perspective, as the user moves in space.

SUMMARY

Embodiments of systems and methods for handling multiple Eye-Gaze Tracking (EGT) sources in virtual, augmented, or mixed reality (xR) applications are described. In an illustrative, non-limiting embodiment, an Information Handling System (IHS) may include a processor and a memory coupled to the processor, the memory having program instructions stored thereon that, upon execution by the processor, cause the IHS to: receive a first EGT vector from a first EGT system and a second EGT vector from a second EGT system; calculate a composite EGT vector using a first weight associated with the first EGT system and a second weight associated with the second EGT system; and render an image, in part, based upon the composite EGT vector.

In various embodiments, the first gaze vector may be defined by a pupil center and a set of glints generated in a user's eye, as detected by the first EGT system, and the second gaze vector may be defined by the pupil center and another set of glints generated in the user's eye, as detected by the second EGT system. The first and second EGT systems may each include a visual spectrum camera or a near-infrared (NIR) camera. The program instructions, upon execution, may cause the IHS to transform the first and second EGT vectors into world space coordinates prior to calculating the composite EGT vector. Moreover, the program instructions, upon execution, may cause the IHS to store the first and second weights in a header portion of the composite EGT vector.

The first gaze vector and the second gaze vector may be collected concurrently during execution of an xR application. For example, the first EGT system may include a Head-Mounted Display (HMD) and the second EGT system may include an external display of a host IHS tethered to the HMD. The program instructions, upon execution may cause the IHS to calculate the first and second weights based on a telemetry indicator. The telemetry indicator may include a measure of at least one of: ambient light, head position, distance, or head orientation.

The program instructions, upon execution, may configure the IHS to, in response to a value increase in the telemetry indicator, perform at least one of: increase the first weight or decrease the second weight. Additionally, or alternatively, the program instructions, upon execution may configure the IHS to, in response to a value increase in the telemetry indicator, perform at least one of: decrease the first weight or increase the second weight. Additionally, or alternatively, the program instructions, upon execution may configure the IHS to, in response to a value decrease in the telemetry indicator, perform at least one of: increase the first weight or decrease the second weight. Additionally, or alternatively, the program instructions, upon execution may configure the IHS to, in response to a value decrease in the telemetry indicator, perform at least one of: decrease the first weight or increase the second weight.

In some cases, the program instructions, upon execution by the processor, may configure the IHS to: receive a third EGT vector from a third EGT system; and calculate the composite EGT vector, in part, using a third weight associated with the third EGT system.

In another illustrative, non-limiting embodiment, a method may include receiving a first EGT vector from a first EGT system of an HMD and a second EGT vector from a second EGT system of an external display; calculating a composite EGT vector using a first weight associated with the first EGT system and a second weight associated with the second EGT system; and displaying an image via the HMD, in part, based upon the composite EGT vector.

The method may also include receiving a third EGT vector from a third EGT system of an EGT module; and calculating the composite EGT vector, in part, using a third weight associated with the third EGT system. The method may include calculating the first and second weights based on a present ambient light level indication, and in response to a value increase in the ambient light level, performing at least one of: increasing the first weight or decreasing the second weight. Additionally, or alternatively, the method may include calculating the first and second weights based on a present ambient light level indication, and in response to a value increase in the ambient light level, performing at least one of: decreasing the first weight or increasing the second weight.

In yet another illustrative, non-limiting embodiment, a hardware memory may have program instructions stored thereon that, upon execution by a processor of the IHS, cause the IHS to: receive a first EGT vector from a first EGT system, a second EGT vector from a second EGT system, and a third EGT vector from a third EGT system; calculate a composite EGT vector using a first weight associated with the first EGT system, a second weight associated with the second EGT system, and a third weight associated with the third EGT system; and produce an image, in part, based upon the composite EGT vector. In some cases, at least one of the first, second, and third weights may be selected based upon a hardware or software attribute of the first, second, and third EGT systems, respectively.

BRIEF DESCRIPTION OF THE DRAWINGS

The present invention(s) is/are illustrated by way of example and is/are not limited by the accompanying figures. Elements in the figures are illustrated for simplicity and clarity, and have not necessarily been drawn to scale.

DETAILED DESCRIPTION

Embodiments described herein provide systems and methods for handling multiple Eye-Gaze Tracking (EGT) sources in virtual, augmented, or mixed reality (xR) applications. These techniques are particularly useful in xR applications that employ Head-Mounted Devices (HMDs), Heads-Up Displays (HUDs), and eyeglasses—collectively referred to as "HMDs."

Figure 1:
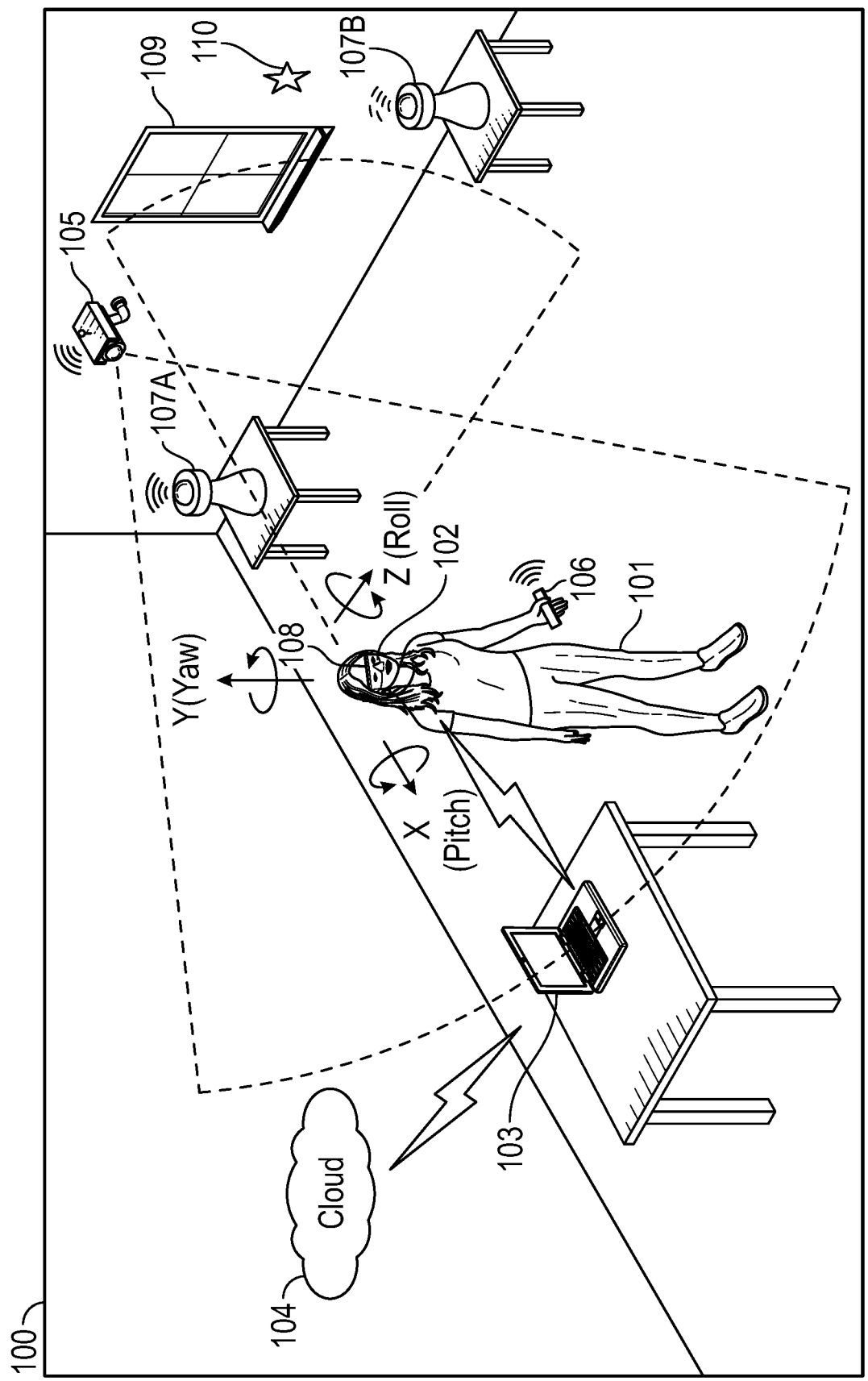
FIG. 1 illustrates an example of an environment where a virtual, augmented, or mixed reality (xR) application may be executed, according to some embodiments.

FIG. 1 is a perspective view of an example of physical environment 100 where an xR application is executed. In various embodiments, user 101 may wear HMD 102 around their heads and over their eyes, during execution of an xR application. An xR application may include a subset of components or objects executed by HMD 102 and another subset of components or objects executed by host IHS 103.

HMD 102 may be tethered to host IHS 103 via a wired or wireless connection. Particularly, host IHS 103 may be used to generate digital images to be displayed by HMD 102. HMD 102 transmits information to host IHS 103 regarding the state of user 101 (e.g., physical position, head orientation, gaze focus, etc.), which in turn enables host IHS 103 to determine which image or frame to show to the user next, and from which perspective.

For instance, as user 101 moves about environment 100, any change in: (i) physical location (e.g., x, y, and z) or translation; or (ii) orientation (e.g., pitch, yaw, and roll) or rotation, may cause host IHS 103 to effect a corresponding change in the picture or symbols displayed to user 101 via HMD 102. These changes may be detected by HMD 102 and processed by host IHS 103, for example, to maintain congruence with the outside world and/or to allow user 101 to look around a consistent xR environment.

In some implementations, host IHS 103 may execute a runtime or rendering engine, such as UNITY, UNREAL, AUTODESK, etc., which produces a visual xR model displayed by HMD 102 from a unique point-of-view, based upon the location, pose, and/or gaze of user 101—which may be determined, at least in part, using Simultaneous Location and Mapping (SLAM).

As used herein, the term SLAM refers systems and methods that use positional tracking devices to construct a map of an unknown environment where an HMD is located, and that simultaneously identifies where the HMD is located, its orientation, and/or pose.

To enable positional tracking for SLAM purposes, HMD 102 may use wireless, inertial, acoustic, or optical sensors. And, in many embodiments, each different SLAM method may use a different positional tracking source or device. For example, wireless tracking may use a set of anchors or lighthouses 107A-B that are placed around the perimeter of environment 100 and/or one or more totems 106 or tags 110 that are tracked; such that HMD 102 triangulates its position and/or state using those elements.

Inertial tracking may use data from accelerometers and gyroscopes within HMD 102 to find a velocity and position of HMD 102 relative to some initial point. Acoustic tracking may use ultrasonic sensors to determine the position of HMD 102 by measuring time-of-arrival and/or phase coherence of transmitted and receive sound waves.

Optical tracking may include any suitable computer vision algorithm and tracking device, such as a camera of visible, infrared (IR), or near-IR (NIR) range, a stereo camera, and/or a depth camera (IR covers a portion of the electromagnetic spectrum from approximately 0.9 µm to 14 µm). With inside-out tracking using markers, for example, camera 108 may be embedded in HMD 102, and infrared markers 107A-B or tag 110 may be placed in known stationary locations. With outside-in tracking, camera 105 may be placed in a stationary location and infrared markers 106 may be placed on HMD 102 or held by user 101. In others cases, markerless inside-out tracking may use continuous searches and feature extraction techniques from video frames obtained by camera 108 (e.g., using visual odometry) to find natural visual landmarks (e.g., window 109) in environment 100.

In some cases, an IR or NIR SLAM camera may be further configured to capture thermographic images of target objects, and to provide accurate non-contact temperature measurements of those objects.

Figure 2:
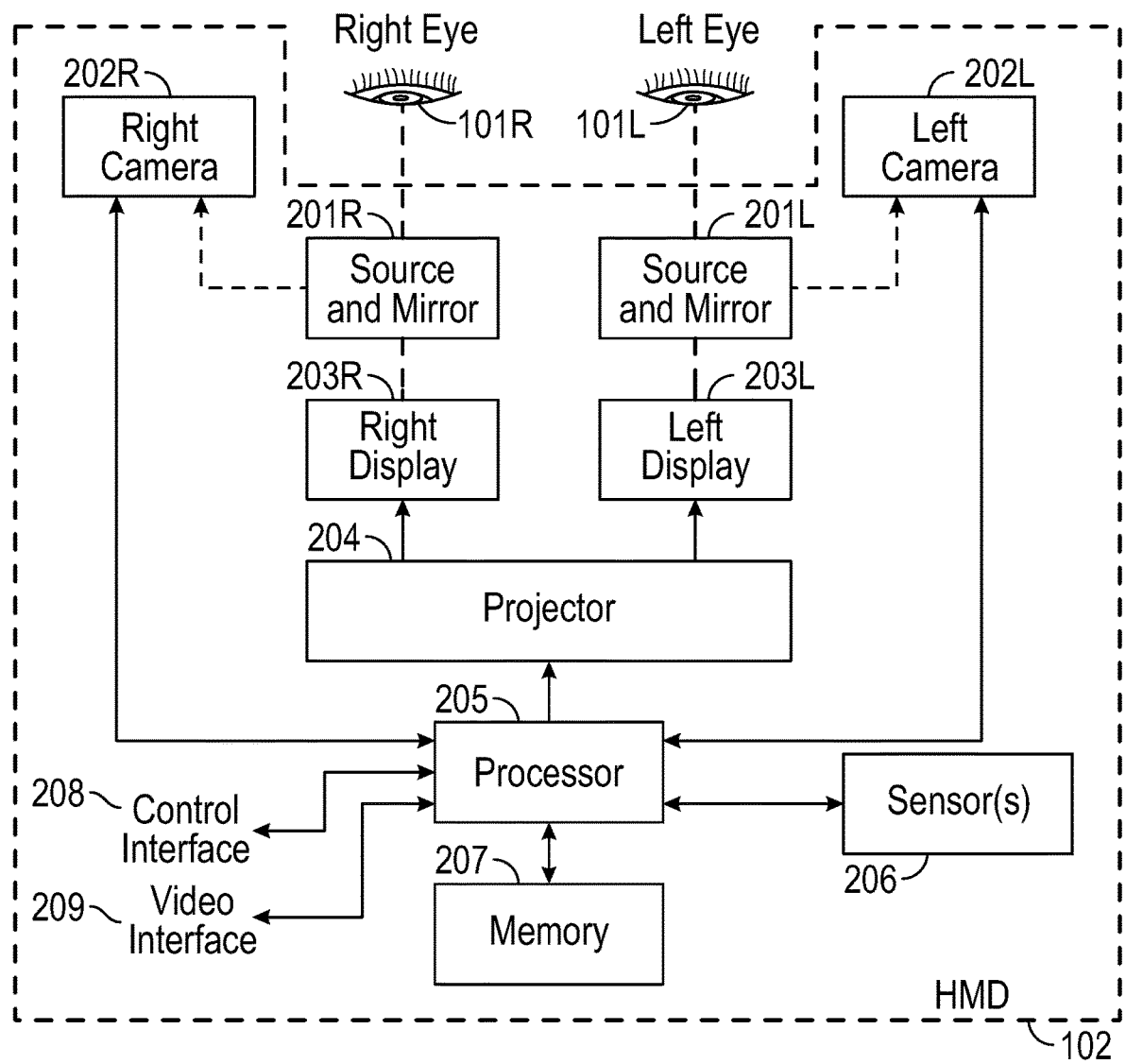
FIG. 2 illustrates an example of electronic components of a Head-Mounted Display (HMD), according to some embodiments.

FIG. 2 illustrates an example of electronic components of HMD 102. In some embodiments, HMD 102 comprises a projection system that includes a projector 204 configured to display image frames, including stereoscopic right and left images, on right and left displays 203R and 203L that are viewed by a user right and left eyes 101R and 101L, respectively. Such a projection system may include, for example, a Digital Light Processing (DLP), a Liquid Crystal Display (LCD), or the like. To create a three-dimensional (3D) effect in a 3D virtual view, virtual objects (VOs) may be rendered at different depths or distances in the two images.

HMD 102 includes processor 205 configured to generate frames that are displayed by projector 204. Hardware memory 207 is configured to store program instructions executable by processor 205, as well as other data. In other embodiments, however one or more operations described for processor 205 may be implemented by a different processor within IHS 103.

Accordingly, in some embodiments, HMD 102 may also include control interface 208 and video interface 209 (e.g., a Bluetooth technology interface, USB interface, etc.) configured to communicate with IHS 103. Control interface 208 may provide forward and backward communication channels between HMD 102 and IHS 103, depending upon the architecture of the xR system, to facilitate execution of an xR application. For example, program instructions stored in memory 207, when executed by processor 205, may cause frames captured by camera(s) 108 to be transmitted to IHS 103 via control interface 208.

IHS 103 may in turn execute SLAM module 403 (FIG. 4), for example, based upon landmarks found in the video frames received from cameras 108. Particularly, SLAM module 403 may be configured to implement tracking techniques that use distinctive visual characteristics of the physical environment to identify specific images or shapes which are then usable to calculate HMD 102's position and orientation. Then, rendering engine 406 (FIG. 4) may use data from SLAM module 403 to render an image to be provided to projector 204 via video interface 209 (e.g., High-Definition Multimedia Interface or "HDMI," Digital Visual Interface or "DVI," DISPLAYPORT, etc.). In some cases, video interface 209 may include two separate video interfaces, one for each display 203R/L. Additionally, or alternatively, a single interface that supports multi-stream may be used to drive both displays 203R/L.

In some embodiments, HMD 102 may include one or more sensors 206 that collect information about the user's environment (e.g., video, depth, lighting, motion, etc.) and provide that information to processor 205. Sensors 206 may include, but are not limited to, inside-out cameras, outside-in cameras, eye tracking cameras, RGB cameras, gesture cameras, infrared (IR) or near-IR (NIR) cameras, SLAM cameras, etc. Additionally, or alternatively, sensors 206 may include electric, magnetic, radio, optical, infrared, thermal, force, pressure, acoustic, ultrasonic, proximity, position, deformation, movement, velocity, rotation, gyroscopic, and/or acceleration sensor(s). In some cases, sensors 206 may be coupled to processor 205 via a sensor hub.

HMD 102 may be configured to render and display frames to provide an xR view for user 101 according to inputs from sensors 206. For example, an xR view may include renderings of the user's real-world environment based on video captured by camera 108. The xR view may also include virtual objects composited with the projected view of the user's real environment.

Still referring to FIG. 2, right and left Near Infra-Red (NIR) light sources 201R and 201L (e.g., NIR LEDs) may be positioned in HMD 102 to illuminate the user's eyes 101R and 101L, respectively. Mirrors 201R and 201L (e.g., "hot mirrors") may be positioned to direct NIR light reflected from eyes 101R and 101L into EGT cameras 202R and 202L located on each side of the user's face. In other implementations, instead of EGT cameras 202R and 202L, a single EGT camera, or a combination of a wide-angle camera with and a narrower-angle camera, may be used.

EGT information captured by cameras 202R and 202L may be provided to the processor 205 to be further processed and/or analyzed. For example, processor 205 may adjust the rendering of images to be projected, and/or it may adjust the projection of the images by the projector 204 based on the direction and angle at which eyes 101R/L are looking. Additionally, or alternatively, processor 205 may estimate the point of gaze on right and left displays 203R and 203L to enable gaze-based interaction with xR content shown on those displays.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below.

Figure 3:
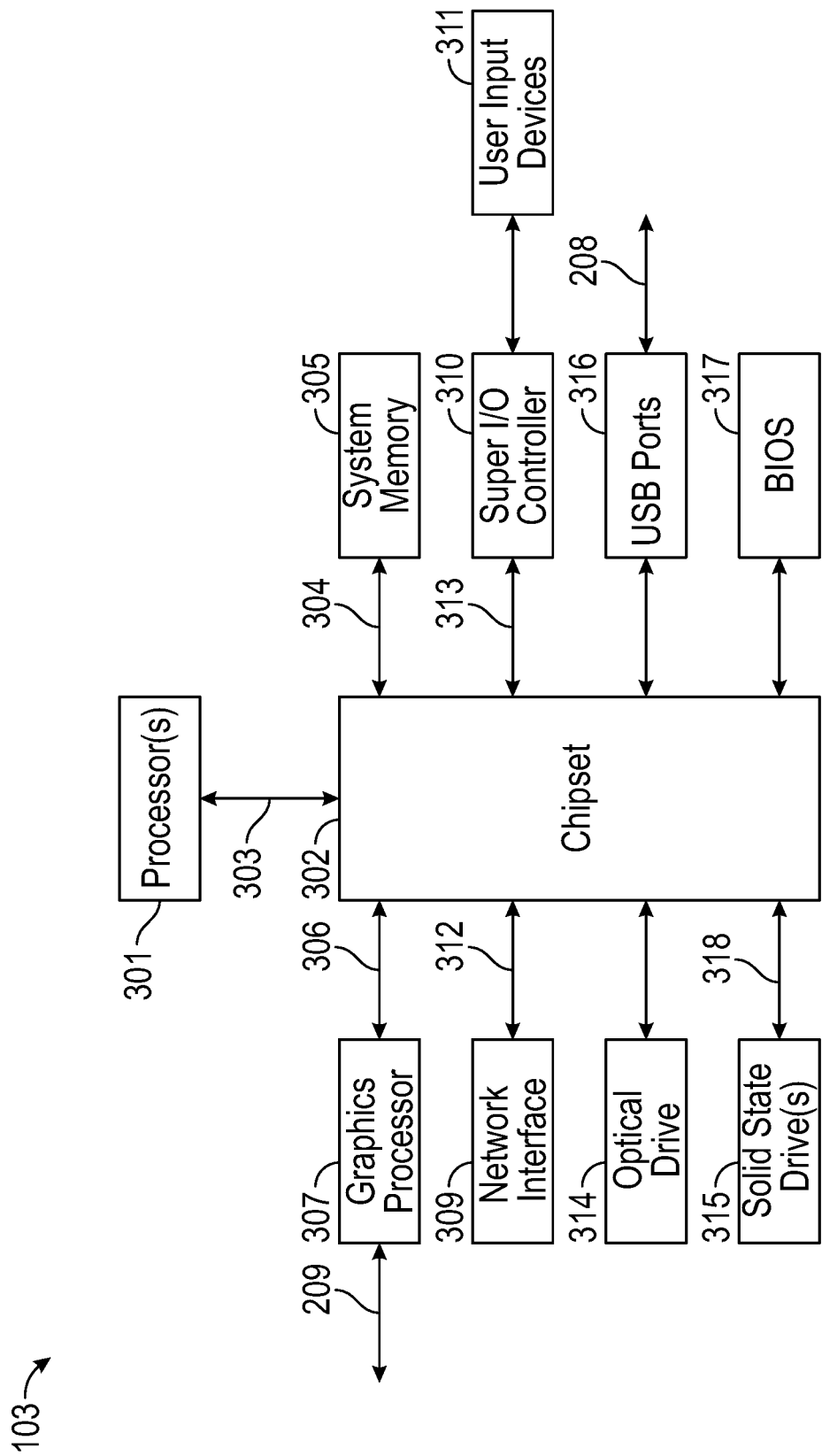
FIG. 3 illustrates an example of electronic components of an Information Handling System (IHS), according to some embodiments.

FIG. 3 is a block diagram of host IHS 103, according to certain embodiments. As shown, IHS 103 may include one or more processors 301. In various implementations, IHS 103 may be a single-processor system including one processor 301, or a multi-processor system including two or more processors 301. Processor(s) 301 may include any processor capable of executing program instructions, such as an Intel Pentium™ series processor or any general-purpose or embedded processors having any of a variety of Instruction Set Architectures (ISAs), such as the x86, POWERPC®, ARM®, SPARC®, or MIPS® ISAs, or any other suitable ISA.

IHS 103 includes chipset 302 that may include one or more integrated circuits that are connect to processor(s) 301. In certain embodiments, chipset 302 may utilize QuickPath Interconnect (QPI) bus 303 for communicating with the processor(s) 301. Chipset 302 provides the processor(s) 301 with access to a variety of resources. For instance, chipset 302 provides access to system memory 305 over memory bus 304. System memory 305 may be configured to store program instructions and/or data accessible by processors(s) 301. In various embodiments, system memory 305 may be implemented using any suitable memory technology, such as static RAM (SRAM), dynamic RAM (DRAM) or nonvolatile/Flash-type memory.

Chipset 302 may also provide access to graphics processor 307. In certain embodiments, graphics processor 307 may be comprised within one or more video or graphics cards that have been installed as components of IHS 103. Graphics processor 307 may be coupled to chipset 302 via graphics bus 306 such as provided by an Accelerated Graphics Port (AGP) bus or a Peripheral Component Interconnect Express (PCIe) bus. In certain embodiments, graphics processor 307 generates display signals and provides them to HMD device 102 via video interface 209.

In certain embodiments, chipset 302 may also provide access to one or more user input devices 311. In such embodiments, chipset 302 may be coupled to a super I/O controller 310 that provides interfaces for a variety of user input devices 311, in particular lower bandwidth and low data rate devices. For instance, super I/O controller 310 may provide access to a keyboard and mouse or other peripheral input devices. In certain embodiments, super I/O controller 310 may be used to interface with coupled user input devices 311 such as keypads, biometric scanning devices, and voice or optical recognition devices, through wired or wireless connections. In certain embodiments, chipset 302 may be coupled to the super I/O controller 310 via a Low Pin-Count (LPC) bus 313.

Other resources may also be coupled to the processor(s) 301 of IHS 103 through chipset 302. In certain embodiments, chipset 302 may be coupled to a network interface 309, such as provided by a Network Interface Controller (NIC) that is coupled to IHS 103. In certain embodiments, the network interface 309 may be coupled to chipset 302 via a PCIe bus 312. According to various embodiments, network interface 309 may support communication via various wired and/or wireless networks. In certain embodiments, chipset 302 may also provide access to one or more Universal Serial Bus (USB) ports 316; which in some implementations may serve as transport for establishing control interface 208 with HMD 102.

Chipset 302 also provides access to one or more solid-state storage devices 315. Chipset 302 utilizes a PCIe bus interface connection 318 in order to communication with the solid-state storage device 315. In certain embodiments, chipset 302 may also provide access to other types of storage devices. For instance, in addition to the solid-state storage device 315, an IHS 103 may also utilize one or more magnetic disk storage devices, or other types of the storage devices such as an optical drive 314 or a removable-media drive. In various embodiments, the solid-state storage device 315 may be integral to IHS 103 or may be located remotely from IHS 103.

Another resource that may be accessed by processor(s) 301 via chipset 302 is a Basic Input/Output System (BIOS) 317. As described in more detail below with respect to additional embodiments, upon powering or restarting IHS 103, processor(s) 301 may utilize BIOS 317 instructions to initialize and test hardware components coupled to IHS 103 and to load an operating system for use by IHS 103. BIOS 317 provides an abstraction layer that allows the operating system to interface with certain hardware components that are utilized by IHS 103. Via this hardware abstraction layer provided by BIOS 317, the software executed by the processor(s) 301 of IHS 103 is able to interface with certain I/O devices that are coupled to IHS 103. As used herein, the term "BIOS" is intended to also encompass Unified Extensible Firmware Interface (UEFI).

In various embodiments, HMD 102 and/or host IHS 103 may not include each of the components shown in FIGS. 2 and 3, respectively. Additionally, or alternatively, HMD 102 and/or host IHS 103 may include various components in addition to those that are shown in FIGS. 2 and 3. Furthermore, some components that are represented as separate components in FIGS. 2 and 3 may, in some embodiments, be integrated with other components. For example, in various implementations, all or a portion of the functionality provided by the illustrated components may instead be provided by components integrated into the one or more processor(s) as a system-on-a-chip (SOC) or the like.

Figure 4:
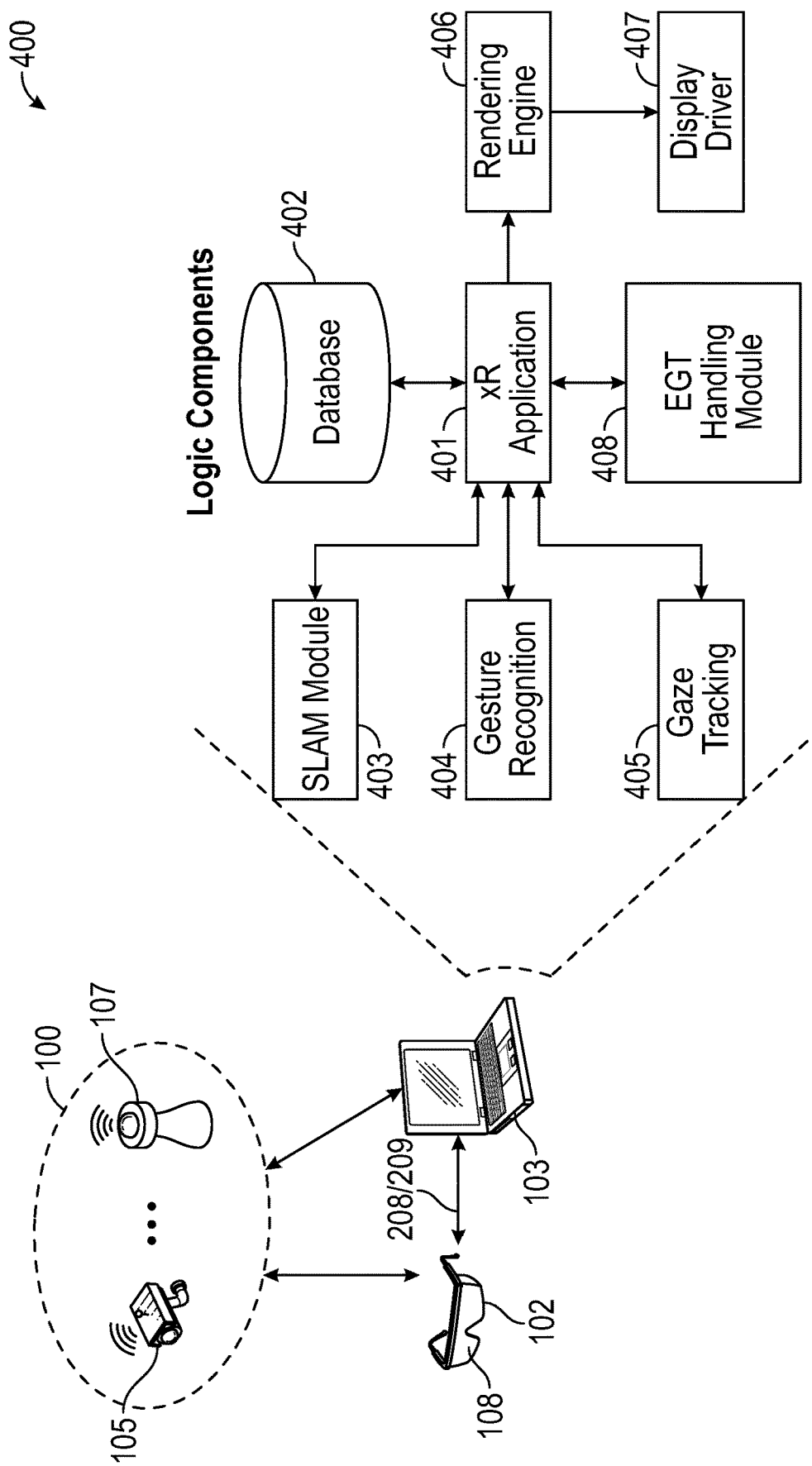
FIG. 4 illustrates an example of logic components of an xR application, according to some embodiments.

FIG. 4 illustrates logic components 400 of xR application 401. In various embodiments, logic components 400 may be executed by IHS 103 and/or HMD 102, such that sub-parts of each of logic components 400 may run on processor 205 of HMD 102 and/or 301 of IHS 103. Moreover, program instructions implementing logic components 400 may be stored in memory 207 of HMD 102 and/or memory 305 of IHS 103.

Generally speaking, xR application 401 may include any type of application now existing or yet to be developed, including, but not limited to: entertainment, video games, robotics, healthcare, education and training, military uses, occupational safety, engineering, industrial or product design, collaboration applications, virtual meetings, etc. Moreover, any data required or otherwise used during operation of xR application 401 may be stored in database 402, discussed in more detail below.

SLAM module 403 uses positional tracking devices to construct a map of an unknown environment where HMD 102 is located, which simultaneously identifies where the HMD is located, its orientation, and/or pose. Generally, SLAM module 403 may include a propagation component, a feature extraction component, a mapping component, and an update component. The propagation component may receive angular velocity and accelerometer data from an Inertial Measurement Unit (IMU) built into HMD 102, for example, and it may use that data to produce a new HMD position and/or pose estimation. A camera (e.g., a depth-sensing camera) may provide video frames to the feature extraction component, which extracts useful image features (e.g., using thresholding, blob extraction, template matching, etc.), and generates a descriptor for each feature. These features, also referred to as "landmarks," are then fed to the mapping component.

The mapping component may be configured to create and extend a map, as HMD 102 moves in space. Landmarks may also be sent to the update component, which updates the map with the newly detected feature points and corrects errors introduced by the propagation component. Moreover, the update component may compare the features to the existing map such that, if the detected features already exist in the map, the HMD's current position may be determined from known map points.

An estimator, such as an Extended Kalman filter (EKF), may be used for handling the propagation component of an inside-out SLAM method. A map may be generated as a vector stacking sensors and landmarks states, modeled by a Gaussian variable. The map may be maintained using predictions (e.g., when HMD 102 moves) and/or corrections (e.g., camera 108 observes landmarks in the environment that have been previously mapped). In other cases, a map of environment 100A may be obtained, at least in part, from cloud 104.

For example, HMD 102 may capture IR/NIR frames (e.g., from camera 108), perform image pre-processing operations, generate object detection of landmarks using feature extraction techniques, and send SLAM data (e.g., pixel values for each pixel in the ROI, along with IR/NIR frame data, coordinates of detected landmarks, etc.) to host IHS 103. Host IHS 103 may perform EKF operations for each detected landmark and it may calculate a Kalman Gain (G) for each landmark (L), which in turn indicates a confidence or probability of the landmark's measured location being accurate.

Gesture recognition module 404 may use one or more cameras or optical sensors that enable user 101 to use their actual hands for interaction with virtual objects (VOs) rendered by projector 204 within HMD 102. For example, gesture recognition module 404 may be configured to implement hand tracking and gesture recognition in a 3-D space via a user-facing 2-D camera. In some cases, gesture recognition module 404 may track a selectable number of degrees-of-freedom (DOF) of motion, with depth information, to recognize dynamic hand gestures (e.g., swipes, clicking, tapping, grab and release, etc.) usable to control or otherwise interact with xR application 401.

Gesture detection begins when video frame data (e.g., a video or depth-video stream) is received at host IHS 103 from gesture or RGB camera 108 of HMD 102. In some implementations, video data may have already been processed, to some degree, by processor 205 of HMD 102. Then, the video data is further processed by processors 302 and/or 307 in IHS 103 to control aspects of xR application 401, by identifying various gestures and sequences that constitute user input. At least a portion of the user's body may be identified in the video frame data obtained using gesture or RGB camera 108. For example, through image processing, a given locus of a video frame or depth map may be recognized as belonging to user 101. Pixels that belong to user 101 (e.g., arms, hands, fingers, etc.) may be identified, for example, by sectioning off a portion of the video frame or depth map that exhibits above-threshold motion over a suitable time scale, and attempting to fit that section to a geometric model of user 101. If a suitable fit is achieved, then pixels in that section may be recognized as those of user 101.

Gesture recognition module 404 may be configured to analyze pixels of a video frame or depth map that correspond to user 101, in order to determine what part of the user's body each pixel represents. A number of different body-part assignment techniques may be used. In an example, each pixel of the video frame or depth map may be assigned a body-part index. The body-part index may include a discrete identifier, confidence value, and/or body-part probability distribution indicating the body part or parts to which that pixel is likely to correspond. Machine learning may be used to assign each pixel a body-part index and/or body-part probability distribution. Such a machine learning method may analyze a user with reference to information learned from a previously trained collection of known gestures and/or poses stored in a calibration database. During a supervised training phase, for example, a variety of gesture sequences may be observed, and trainers may provide label various classifiers in the observed data. The observed data and annotations may then be used to generate one or more machine-learned algorithms that map inputs (e.g., observation data from a depth camera) to desired outputs (e.g., body-part indices for relevant pixels).

Thereafter, a partial virtual skeleton may be fit to at least one body part identified. In some embodiments, a partial virtual skeleton may be fit to the pixels of video frame or depth data that correspond to a human arm, hand, and/or finger(s). A body-part designation may be assigned to each skeletal segment and/or each joint. Such virtual skeleton may include any type and number of skeletal segments and joints, including each individual finger. By analyzing positional change in the various skeletal joints and/or segments, certain corresponding movements that indicate predetermined gestures, actions, or behavior patterns of user 101 may be identified. In other embodiments, the use of a virtual skeleton may not be necessary. For example, in other implementations, raw point-cloud data may be sent directly to a feature extraction routine within a gesture recognition module.

Examples of one and two-handed gestures that may be recognized or tracked by gesture recognition module 404 include, but are not limited to: gestures for selecting and deselecting VOs, gestures for manipulating selected VOs (e.g., rotation and/or translation following the user's hand direction, position, and/or location), gestures for performing menu operations such as opening, closing, and/or repositioning (again, with menu rotation and/or translation following the user's hand), and gestures for manipulating applications, windows, or workspaces (e.g., using downward or upward swiping hand motion), among many others.

Gaze tracking module 405 may use an inward-facing projector, configured to create a pattern of infrared or (near-infrared) light on the user's eyes, and an inward-facing camera configured to take high-frame-rate images of the eyes and their reflection patterns; which are then used to calculate the user's eye's position and gaze focus or point. In some cases, gaze tracking module 405 may be configured to identify a direction, extent, and/or speed of movement of the user's eyes in real-time, during execution of an xR application (e.g., a gaze vector). In addition, gaze tracking module 405 may be configured to calculate a region-of-interest of configurable size or shape (e.g., circular, rectangular, etc.), based in part upon the gaze vector.

As used herein, the term "gaze vector" is defined as a group of variables calculated using reflections from pupil center and another set of glints generated in the user's eye. In some cases, a gaze vector may include one or more of the following variables: 3D coordinates (x, y, z) of an initial point (e.g., the midpoint between the user's eyes), and pitch and yaw direction angles.

In various implementations, gaze tracking module 405 may use, among camera(s) and/or sensor(s), NIR light sources to produce glints on the surface of the cornea of the user's eye, and then it may capture images of the eye region using an inward-facing camera. Gaze tracking module 405 may estimate the user's gaze from the relative movement between the pupil center and glint positions. Particularly, an eye and/or gaze tracking algorithm may perform corneal reflection-based calculations that use MR illumination to estimate the gaze direction or the point of gaze using polynomial functions, or a geometrical model of the human eye.

To perform gaze estimation, gaze tracking module 405 may estimate the visual axis and kappa angle of the user's eye, for each user, as part of a calibration operation. Calibration may be performed by showing the user a set of visual targets distributed over the HMD's display, and the user may be asked to gaze at them for a certain amount of time. The inward-facing camera may capture the various eye positions for each target point, which are then mapped to corresponding gaze coordinates.

In some cases, gaze tracking module 405 may be configured to compensate for head movement. For example, a mathematical formula indicating the correspondence of eye gaze with head positions may represent a relationship between user reference gaze directions, head pose direction, and actual gaze direction; which is a result of both head and eye rotation.

In various embodiments, gaze tracking module 405 may perform any of a plurality of different EGT methods. For example, in two-dimensional (2D) regression-based EGT methods, a vector between the pupil center and a corneal glint may be mapped to corresponding gaze coordinates on the frontal screen using a polynomial transformation function. Conversely, three-dimensional (3D)-based EGT methods may use a geometrical model of the human eye to estimate the center of the cornea, optical and visual axes of the eye, and to estimate the gaze coordinates as points of intersection where the visual axes meets the scene.

As such, in various embodiments, gaze tracking module 405 may produce, collect, measure, and/or produce information about a user's intent, cognitive processes, and behavior, based upon the user's eye movements, that may include, but is not limited to: (A) Fixations: phases when the eyes are stationary between movements and visual input occurs (e.g., total fixation duration, mean fixation duration, fixation spatial density, number of areas fixated, fixation sequences and fixation rate); (B) Saccades: rapid and involuntary eye movements that occur between fixations (e.g., saccade number, amplitude and fixation-saccade ratio); (C) Scanpath: a series of short fixations and saccades alternating before the eyes reach a target location on the screen (e.g., scanpath direction, duration, length and area covered); (D) Gaze duration: a sum of all fixations made in an area of interest before the eyes leave that area and also the proportion of time spent in each area; and/or (E) Pupil size and blink: measures used to study cognitive workload.

Based upon the foregoing, gaze tracking module 405 may be configured to follow the user's gaze direction for natural exploration of a visual scene by capturing the user's visual perspective. Moreover, gaze tracking module 405 may also be configured to estimate user gaze and blink-state for interacting with the xR environment; several types of eye movements and gestures, such as saccades, smooth pursuit and nod-roll may be used. For example, gaze tracking module 405 may be configured to use gaze, dwell time, and half-blink information for the purpose of hands-free object selection. Multiple input parameters may be used to avoid accidental selection of items. Pupil motion may be tracked to estimate a user's viewing point, with Kalman filtering to minimize pupil jitter and drifts.

EGT handling or selection module 408 may implement any method for handing off and/or switching between two or more available EGT systems. For example, if HMD 102 includes a first EGT system built into its frame, and IHS 103 includes a second EGT system built into its display (e.g., external display 501 in FIG. 5), EGT handling module 408 may control aspects of the operation of each EGT system. Additionally, or alternatively, EGT handling module 408 may communicate with xR application 401 to enable processing of selected EGT outputs or data (e.g., gaze vector, speed, duration, etc.) from different EGT sources or systems being provided by gaze tracking module 405.

EGT handling or selection module 408 may also implement hybrid or concurrent use of multiple EGT systems. In some cases, IHS 103 may receive multiple streams of EGT data (e.g., a first EGT vector from HMD 102 and a second EGT vector from external display 501) for the same HMD wearer 101. Then, EGT handling or selection module 408 may adaptively and/or dynamically combine the EGT data from the various EGT sources based on context (e.g., user's distance from camera, amount of ambient visible light, amount of ambient IR light, etc.).

In various embodiments, EGT handling or selection module 408 may operate as a software service that performs a calibration or training operation (e.g., using an offline machine learning classifier) to generate weights (e.g., on a scale from 0 to 1, or from 1 to 10, with the lowest value indicating highest priority) for combining various EGT sources and data, and to perform steady-state adaptive combining of EGT gaze vectors from the EGT sources, based on context, and driven into the classifier to generate and/or adapt the weights. As such, EGT handling or selection module 408 enables IHS 103 to seamlessly transition from one EGT modality to another, as the weights dynamically change.

To illustrate this, consider a use-case where, due to ambient IR light, a first EGT source in HMD 102 that relies upon NIR techniques cannot provide a reliable EGT output (for one eye or both eyes), yet a second EGT source in external display 501 may calculate EGT based on head position and visible light only, and therefore it may be immune to the ambient IR. Without the ambient light, the first EGT source in HMD 102 would be more accurate and reliable, but with the ambient IR light, the second EGT source in extremal display 501 would be the preferred choice.

In the previous use-case, EGT handling or selection module 408 may use ambient light data from ALS sensor 206 to assign a higher weight to EGT data received from the second EGT source in display 501, and/or to assign a lower weight to EGT data received from the first EGT source in HMD 102. Adjustments to the first and second weights are made progressively as the ambient light changes, such that, if the ambient IR light decreases (e.g., drops below a selected threshold value), EGT handling or selection module 408 may assign a higher weight to EGT data received from the first EGT source in HMD 102, and/or it may assign a lower weight to EGT data received from the first EGT source in HMD 102.

As such, EGT handling or selection module 408 ensures that the best composite, combined, and/or blended EGT data is used by xR application 401 at all times. EGT handling or selection module 408 also performs xR space normalization to transform an EGT vector from any given coordinate system used by the EGT source or system into a common coordinate system (e.g., world space coordinates). The weights calculated using telemetry data may be stored in the composite EGT vector's header portion, and then applied to the composite EGT vector to ensure all EGT modalities are in the same reference frame prior to a rendering operation.

Weights calculation may be achieved through a rules engine, or random forest-based Machine Learning (ML) algorithm. In some embodiments, EGT handling or selection module 408 may adaptively combine EGT sources based on user context using such a rules-based or ML classifier, thus enabling xR Application 401 to seamlessly blend EGT data received from multiple EGT sources in an optimal manner.

Still referring to FIG. 4, rendering engine 406 may include any engine (e.g., UNITY, UNREAL, AUTODESK, etc.) configured to render an xR model or virtual space displayed by HMD 102 from user 101's unique point-of-view based upon the user's coordinate location (e.g., from SLAM module 403), the user's pose (e.g., from an IMU), and/or the user's gaze (e.g., from gaze tracking module 405). Display driver 407 is coupled to rendering engine 406 and configured to convert rendered video frames to a display format that HMD 102 can reproduce.

Database 402 may include a look-up table (LUT) or the like, with calibration data for each EGT system available to xR application 401. Along with the calibration data, database 402 may include characteristics or specifications for each available EGT system for comparison (e.g., accuracy, fidelity, other capabilities) and/or evaluation. Additionally, or alternatively, database 402 may include a set of rules that enable EGT handling module 408 to select one of two or more available EGT system based on selected events.

Figure 5:
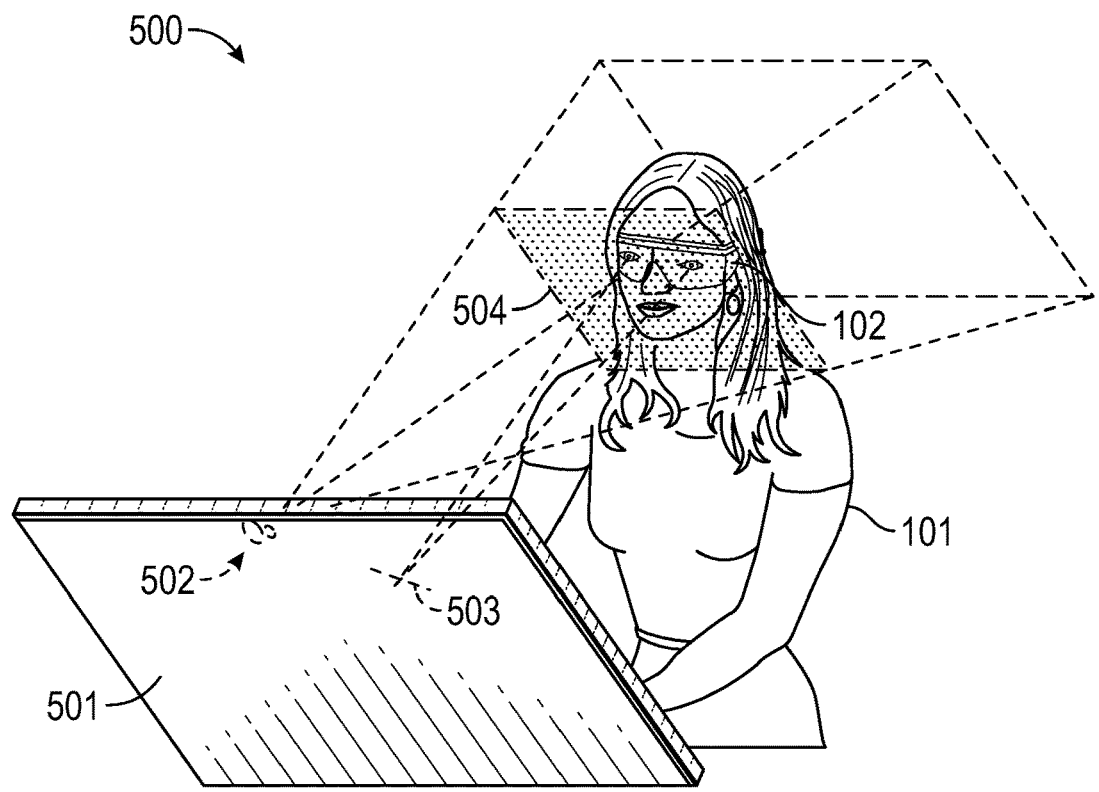
FIG. 5 illustrates an example of a display and an HMD with respective EGT systems, according to some embodiments.

FIG. 5 illustrates an example of display 501 (e.g., the display of host IHS 103, or another external display) and HMD 102, each equipped with its own respective EGT system. Although HMDs 102 can be used as a virtual display, for persistent productivity, a user may have to frequently switching between "AR mode" and regular productivity on "IHS mode". Similarly, while executing an xR application (e.g., a game), the user may need to switch between HMD display where an AR environment is being rendered, for example, and an IHS display for checking email, etc. In these cases, HMD 102 may include an EGT system as shown in FIG. 2 (e.g., 201L/R and 202 L/R) while IHS 103 includes display 501 having its own EGT system 500.

In EGT system 500, projector/camera assembly 502 mounted or built into display 501 may be configured to create a pattern of infrared or (near-infrared) light 504 on eyes of user 101. Projector/camera assembly 502 may be configured to take high-frame-rate images of the user's eyes and their reflection patterns. Then, processor 301 executing program instructions stored in gaze tracking module 405 may be configured to find specific details in the user's eyes that enable it to calculate the eye's position and gaze point or focus 503, using techniques similar to those discussed with respect to the operation of HMD 102. As such, gaze tracking module 405 may be configured to identify a specific window or other area of a screen, and/or a graphical entity being visually inspected by user 101 in real-time.

Figure 6:
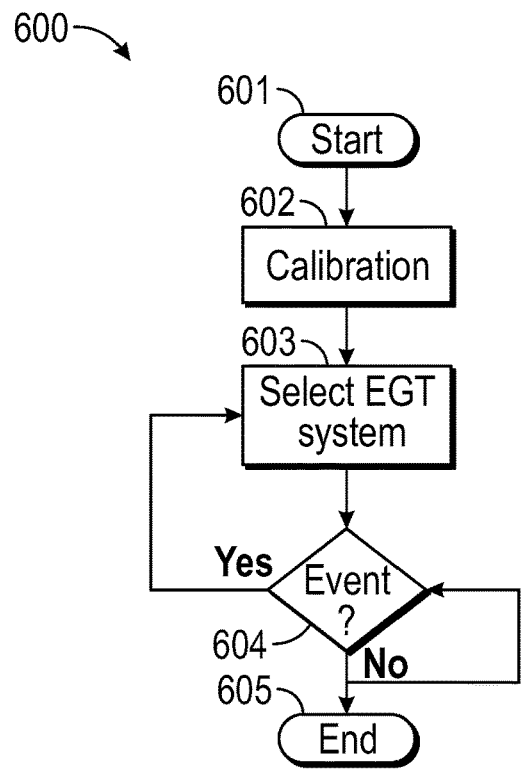
FIG. 6 illustrates an example of a method for EGT handoff, according to some embodiments.

FIG. 6 illustrates method 600 for EGT handoff. In some embodiments, method 600 may be performed by xR application 401 and/or EGT handling module 408 under control of processor 301 of IHS 103, to handoff between two or more EGT systems (e.g., HMD 102's and display 501's).

Method 600 begins at block 601. At block 602, a calibration procedure is performed and/or calibration data may be retrieved from database 402, by EGT handling module 408, for each available EGT system. For example, in the use-case of FIG. 5, user 101 may stand at standard distance(s) from display 501, and gaze vectors may be collected independently by the EGT system of HMD 102 and by the EGT system of display 501, under different conditions and in different applications and contexts, so that performance metrics (e.g., accuracy, features, false-positives, false-negatives, etc.) may be evaluated in those conditions and contexts. A look-up table (LUT) or the like may be created with calibration data to facilitate selection of EGT system during the xR session, depending upon the current state and/or position of: user 101, HMD 102, external display 501, IHS 103, and/or xR application 401.

At block 603, method 600 selects, among the available EGT systems, which output (e.g., gaze vector, speed, duration, identified eye movements, etc.) to be used by xR application 401. Initially, either HMD 102 and/or external display 501 may be selected by default to provide the EGT output. For example, HMD 102 may be selected to provide EGT in response to a detection that HMD 102 is being worn by user 101, or in response to gaze-based interaction with content rendered via HMD 102. Alternatively, display 501 may be selected in response to detection of gaze-based interaction with content rendered on external display 501, and/or other interactions with IHS 103 (e.g., keyboard strokes). Alternatively, a primary EGT system may be selected based on calibration data (e.g., the EGT system with most precise or most features may be initially selected).

At block 604, method 600 determines whether a selected event is detected. If not, method 600 waits until it ends at block 605 (e.g., timeout, power down, etc.) and continues to use the originally selected EGT system. Otherwise, if block 604 detects an event, block 603 may look up responsive action(s) stored in database 402.

Examples of events that may be detected by block 604 include, but are not limited to: (i) selecting the external display 501's EGT system in response to detecting the user's presence within a first distance from external display 501; (ii) selecting the HMD's 102 EGT system in response to detecting the user's presence within a second distance from external display 501 greater than the first distance; (iii) selecting the external display 501's EGT system in response to detecting an ambient light level below a threshold value; (iv) selecting the HMD's 102 EGT system in response to detecting an ambient light level above a threshold value; (v) selecting the external display 501's EGT system in response to detecting a battery level of the HMD at or below a threshold value; (vi) selecting the HMD 102's EGT system in response to detecting a battery level of IHS 103 at or below a threshold value; and/or (vii) selecting the HMD 102's EGT system in response to detecting a loss of line-of-sight between the external display 501's EGT system and the user's eyes.

Figure 7A:
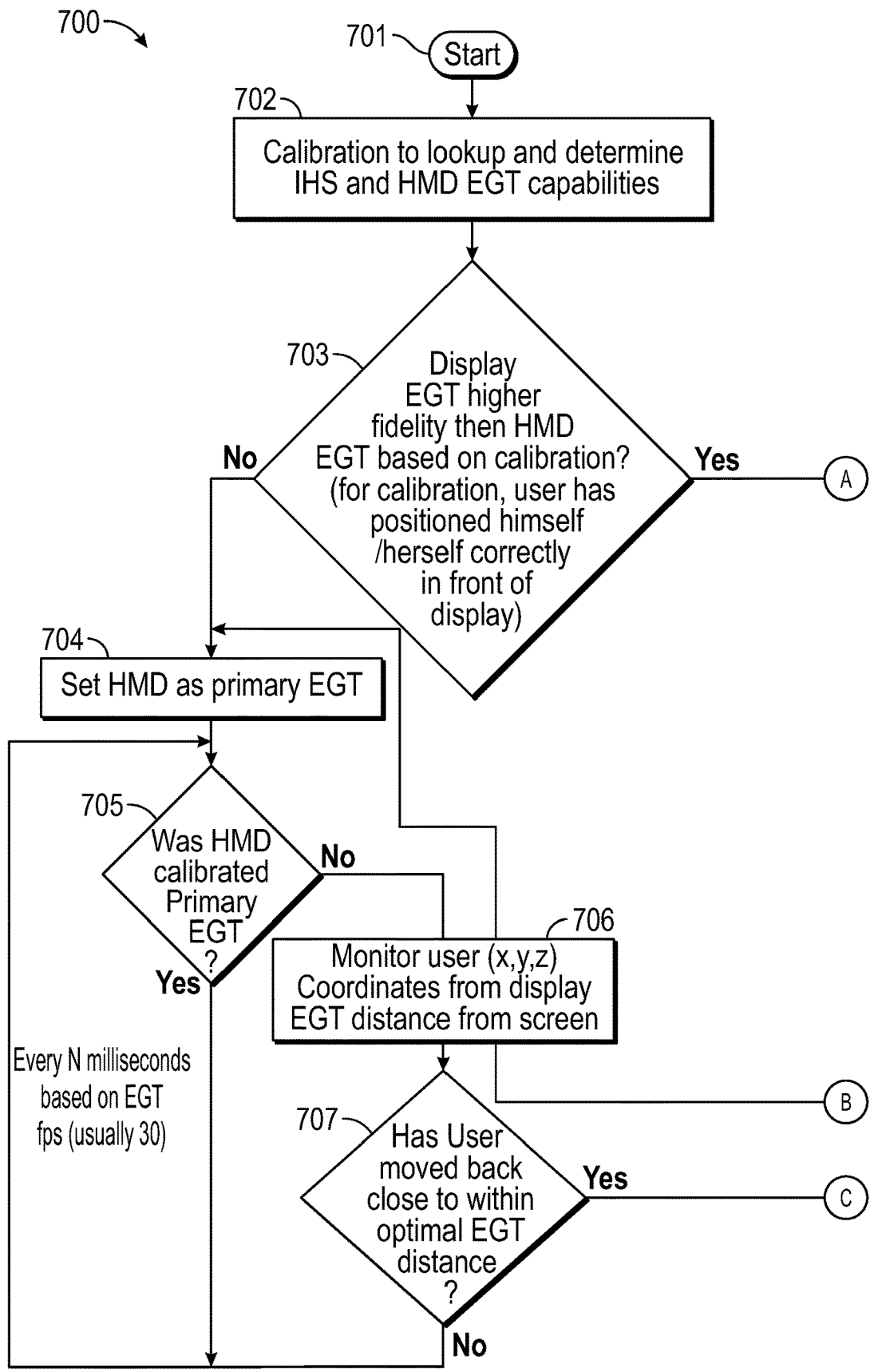
FIGS. 7A and 7B illustrate an example of a method for EGT handoff between an HMD and an external display based upon the user's distance from the external display, according to some embodiments.
Figure 7B:
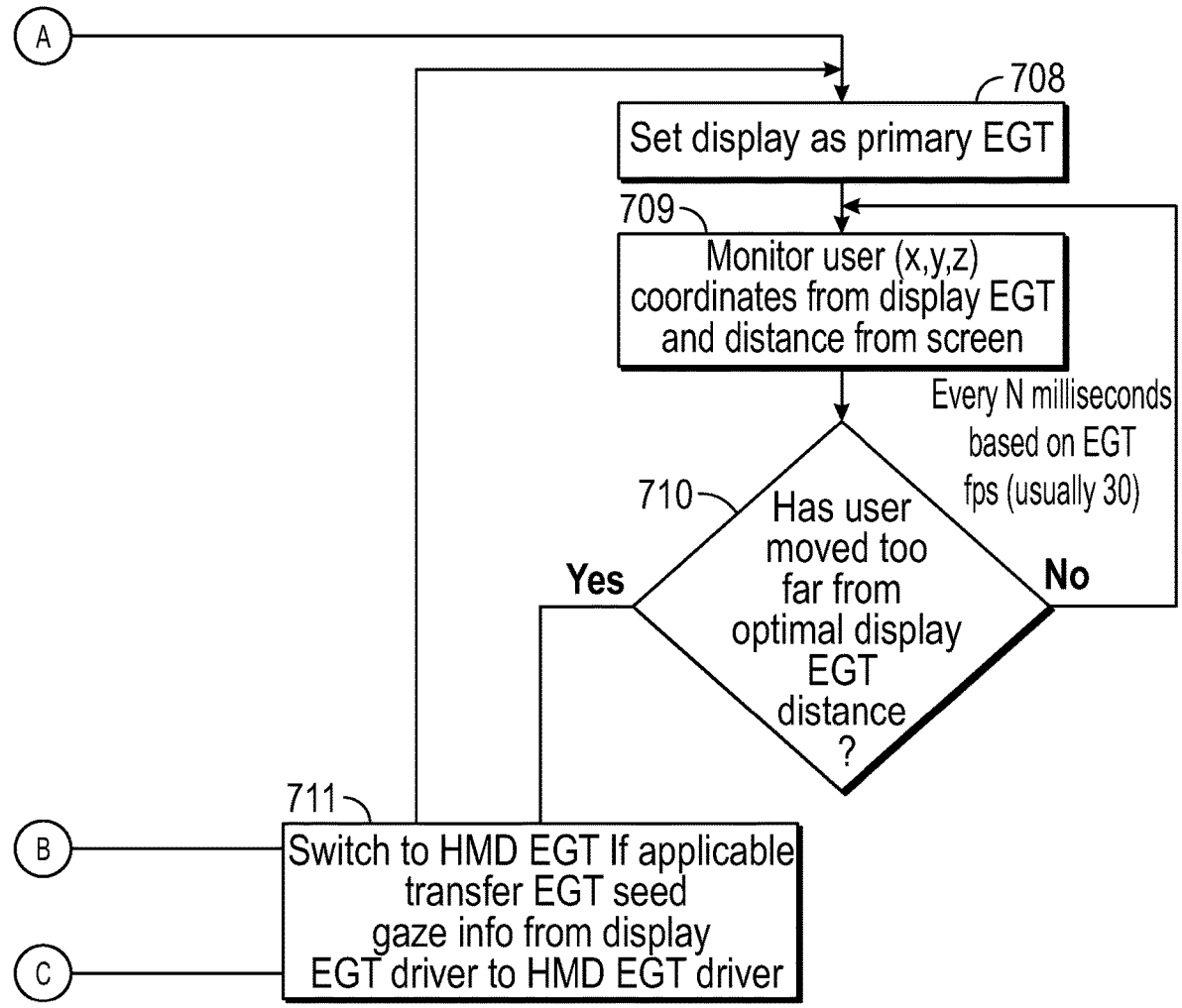

As an implementation of method 600, FIGS. 7A and 7B illustrate method 700 for EGT handoff based upon an HMD user's distance from an external display. Method 700 begins at block 701. At block 702, method 700 performs one or more calibration operations to lookup and/or determine IHS 103 (e.g., display 501) and HMD 102's EGT capabilities (e.g., type of camera, type of modeling and/or output, etc.).

At block 703, method 700 determines whether the EGT system of IHS 103 has a higher fidelity, accuracy, specifications, and/or capabilities than EGT system of HMD 102, for example, based on calibration data (e.g., for a current physical distance between user 101 and display 501). If not, block 704 sets HMD 102 as the primary EGT source, system, and/or camera. If HMD 102 was calibrated as primary EGT at block 702, method 700 waits. Otherwise, block 705 determines whether the HMD was calibrated as primary EGT source and, if not, block 706 monitors the user's position and/or coordinates (x, y, and z) with respect to display 501.

At block 707, if the user has returned to a calibrated, standard, and/or optimal display EGT distance (within threshold value(s)), control passes to block 708. At block 708, method 700 sets display 501 as the primary EGT source, system, and/or camera. Block 709 again monitors the user's distance (x, y, and z) from display 501. At block 710, if the user has moved too far from the calibrated, standard, and/or optimal display EGT distance (outside a threshold value), control passes to block 711.

At block 711, method 700 switches the HMD 102's EGT source, system, and/or camera. In some cases, EGT seed gaze information (e.g., background and/or foreground seed pixel selection) may be transferred from a display EGT driver (e.g., of a portion of gaze tracking module 405 executed by processors 301 and/or 307 of IHS 103) to the HMD EGT driver of gaze tracking module 405 (e.g., of a portion of gaze tracking module 405 executed by processors 301 and/or 307 of IHS 103) via an Application Programming Interface (API) command or the like.

In a conventional use-case, when HMD 102 and IHS 103 have their own EGT systems, each EGT system is independent and/or self-contained, and does not enable heterogeneous or simultaneous use, or switching back and forth between EGT systems. Moreover, a conventional EGT solution is not capable of sharing EGT information outside of the display that it is mapped to, or built into.

In contrast, in the heterogenous use-cases described herein, EGT performance may be improved or optimized for varying HMD and external display capabilities, to maximize user experience, including optimally switching EGT sources, transferring EGT context, and the like. A software service may be executed by IHS 103, with initial calibration for IHS based EGT and HMD based EGT as applicable/present in capability, and steady-state monitoring of EGT performance for both EGTs and using one EGT source as "primary" and another as "secondary."

In some cases, based on IHS and display capabilities of EGT, systems and methods described herein provide calibration and setup of primary and secondary EGT sources. For example, display 501 may have higher EGT functionality than HMD 102 (e.g., 3D model versus 2D regression model). This calibration may be done either on user request or when a new HMD 102 that is not registered to IHS 103 is detected to be connected by tether. In other cases, systems and methods described herein provide the steady-state monitoring of EGT "lock" for user for display 501 as well as HMD 102, and switching EGT source based on perceived accuracy of method based on user position/context. For example, user gets too far away from display 501, then method 700 may switch to HMD 102 EGT even if it may be using an inferior EGT algorithm to display.

In yet other cases, systems and methods described herein may provide steady-state monitoring and switching of EGT sources based on connectivity. For example, if a user started working on IHS 103 with display 501 and later puts on HMD 102, method 600 may switch to HMD 102 EGT or stay with display's EGT depending upon the application being executed, the distance from IHS 103, etc. In still other cases, EGT context and other information (e.g., seed pixels) may be used to fast start calibration using a secondary EGT source when starting up the primary EGT source.

As such, systems and methods described herein adaptively detect, based on user context/distance and connectivity, then switch seamlessly between display 501 EGT and HMD 102 EGT with no perceptible loss of session persistence. Moreover, these systems and methods scale to different HMDs and displays, each with different EGT SOCs/algorithms running, from most complex modeling to simplest model.

Figure 8:
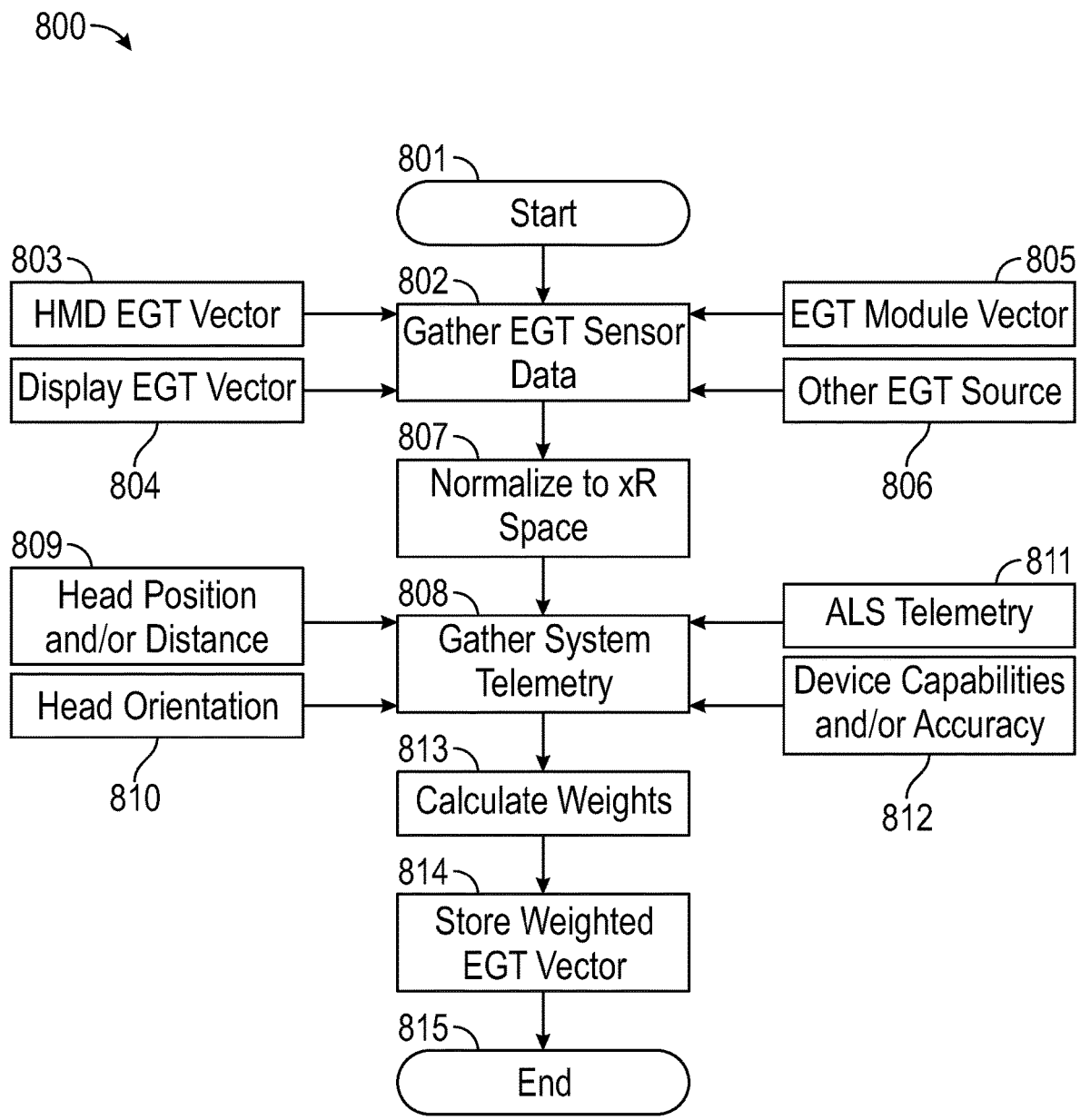
FIG. 8 illustrates an example of a method for handling multiple EGT sources in an xR application, according to some embodiments.

FIG. 8 illustrates an example of method 800 for handling multiple EGT sources. In some embodiments, method 800 may be performed by xR application 401 and/or EGT handling module 408 under control of processor 205 of HMD 102 and/or processor 301 of IHS 103 to create and/or use blended EGT data collected between two or more discrete EGT systems (e.g., HMD 102's and display 501's).

Method 800 begins at block 801. At block 802, method 800 receives first EGT vector 803 (e.g., from a first EGT system in HMD 102), second EGT vector 804 (e.g., from a second EGT system in external display 501), third EGT vector 805 (e.g., from a stand-alone EGT module or peripheral device), and/or fourth EGT vector 806 (e.g., from any other EGT source). In some cases, these various gaze vectors may be collected concurrently. At block 807, method 800 transforms the data from each EGT vector to a common coordinate system, such as xR application 401's world space coordinates, or the like.

At block 808, method 800 gathers system telemetry data from a number of sensors, such as user 101's head position and distance 809 (e.g., from SLAM subsystem), head orientation 810 (e.g., from IMU 206), ambient light telemetry 811 (e.g., from ALS sensor 206), and/or device capabilities and/or accuracy 812 (e.g., pixels/frame, frames/second, detection errors, false positives etc. obtained via calibration). Block 813 calculates a first weight for first EGT vector 803, a second weight for second EGT vector 804, a third weight for third EGT vector 805, and/or a fourth weight for fourth EGT vector 806.

For example, each weight may be calculated as a value between 0 and 1 or between −1 and 1. The assignment of weights for optimal EGT results (e.g., least errors, most accuracy, etc.) may be based on a machine learning algorithm or the like. Then, block 814 stores a composite or weighted EGT vector, for example, with each weight stored in the vector's header.

Method 800 ends at block 815 and/or repeats for at least a portion of an xR session, dynamically adjusting weights of each EGT source depending upon context and varying real-time telemetry conditions.

In some cases, in response to a value increase in a telemetry indicator, block 813 may increase the first weight and/or reduce the second weight. Additionally, or alternatively, in response to a value increase in the telemetry indicator, block 813 may decrease the first weight and/or increase the second weight. Additionally, or alternatively, in response to a value decrease in the telemetry indicator, block 813 may increase the first weight and/or decrease the second weight. Additionally, or alternatively, in response to a value decrease in the telemetry indicator, block 813 may decrease the first weight and/or increase the second weight.

As a result of method 800, xR application 401 may provide composite EGT vector 814 to render engine 406, which may then uses the composite EGT 814 to render an xR image for display by HMD 102. In addition, xR application 401 may use composite EGT vector 814 to identify a user command or other gaze-based interaction.

It should be understood that various operations described herein may be implemented in software executed by logic or processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS) for handling multiple Eye-Gaze Tracking (EGT) sources in virtual, augmented, or mixed reality applications, comprising:
a processor; and
a memory coupled to the processor, the memory having program instructions stored thereon that, upon execution by the processor, cause the IHS to:
receive a first Eye-Gaze Tracking (EGT) vector from a first EGT system coupled to a Head-Mounted Display (HMD);
receive a second EGT vector from a second EGT system coupled to an external display of a host Information Handling System (IHS) tethered to the HMD;
perform a calibration process to generate weights with values indicating priorities using a machine learning algorithm for dynamically combining the first and the second EGT vectors based on a telemetry indicator comprising a measure of at least one of:
ambient light, head position, a user distance from the external display, or head orientation;
dynamically assign a weight with a value indicating a priority to each of the first and second EGT vectors based on telemetry data collected in varying real-time telemetry conditions;
calculate a composite EGT vector using a first weight associated with the first EGT system and a second weight associated with the second EGT system, wherein the first and second weights are calculated based on the telemetry indicator;
at least one of: (i) in response to a value increase in the telemetry indicator, increase the first weight or decrease the second weight, or (ii) in response to a value increase in the telemetry indicator, decrease the first weight or increase the second weight;
at least one of: (i) in response to a value decrease in the telemetry indicator, increase the first weight or decrease the second weight, or (ii) in response to a value decrease in the telemetry indicator, decrease the first weight or increase the second weight; and
render an image of the user's real-world environment on the HMD or the external display, in part, based upon the composite EGT vector.

2. The IHS of claim 1, wherein the first gaze vector is defined by a pupil center and a set of glints generated in a user's eye, as detected by the first EGT system, and wherein the second gaze vector is defined by the pupil center and another set of glints generated in the user's eye, as detected by the second EGT system.

3. The IHS of claim 1, wherein the first and second EGT systems each comprise a visual spectrum camera or a near-infrared (NIR) camera.

4. The HIS of claim 1, wherein the program instructions, upon execution by the processor, further cause the IHS to transform the first and second EGT vectors into world space coordinates prior to calculating the composite EGT vector.

5. The HIS of claim 1, wherein the program instructions, upon execution by the processor, further cause the IHS to store the first and second weights in a header portion of the composite EGT vector.

6. The IHS of claim 1, wherein the first gaze vector and the second gaze vector are collected concurrently during execution of a virtual, augmented, or mixed reality (xR) application.

7. The IHS of claim 1, wherein the program instructions, upon execution by the processor, further configure the IHS to:
receive a third EGT vector from a third EGT system; and
calculate the composite EGT vector, in part, using a third weight associated with the third EGT system.

8. A hardware memory having program instructions stored thereon for handling multiple Eye-Gaze Tracking (EGT) sources in virtual, augmented, or mixed reality applications and that, upon execution by a processor of an Information Handling System (IHS), cause the IHS to:
receive a first Eye-Gaze Tracking (EGT) vector from a first EGT system coupled to a Head-Mounted Display (HMD);
receive a second EGT vector from a second EGT system coupled to an external display of the IHS, wherein the HMD is tethered to the IHS, wherein the first and second weights are calculated based on a telemetry indicator;
perform a calibration process to generate weights with values indicating priorities using a machine learning algorithm for dynamically combining the first and the second EGT vectors based on a telemetry indicator comprising a measure of at least one of:
ambient light, head position, a user distance from the external display, or head orientation;
dynamically assign a weight with a value indicating a priority to each of the first and second EGT vectors based on the telemetry indicator;
calculate a composite EGT vector using a first weight associated with the first EGT system and a second weight associated with the second EGT system, wherein the first and second weights are calculated based on the telemetry indicator;
at least one of: (i) in response to a value increase in the telemetry indicator, increase the first weight or decrease the second weight, or (ii) in response to a value increase in the telemetry indicator, decrease the first weight or increase the second weight;
at least one of: (i) in response to a value decrease in the telemetry indicator, increase the first weight or decrease the second weight, or (ii) in response to a value decrease in the telemetry indicator, decrease the first weight or increase the second weight; and
render an image of the user's real-world environment on the HMD or the external display, in part, based upon the composite EGT vector.

9. The hardware memory of claim 8, wherein the first gaze vector is defined by a pupil center and a set of glints generated in a user's eye, as detected by the first EGT system, and wherein the second gaze vector is defined by the pupil center and another set of glints generated in the user's eye, as detected by the second EGT system.

10. The hardware memory of claim 8, wherein the program instructions, upon execution by the processor, further cause the IHS to transform the first and second EGT vectors into world space coordinates prior to calculating the composite EGT vector.

11. The hardware memory of claim 8, wherein the first EGT system comprises a near-infrared (NIR) camera and wherein the second EGT system comprises a visual spectrum camera.

12. The hardware memory of claim 11, wherein the telemetry indicator comprises a measure of IR ambient light.

13. The hardware memory of claim 8, wherein the telemetry indicator comprises a battery level of the HMD.

14. The hardware memory of claim 8, wherein the program instructions, upon execution by the processor, further configure the IHS to at least one of: transmit EGT seed information to the HMD via an Application Programming Interface (API) or receive EGT seed information from the HMD via the API.

15. A method for handling multiple Eye-Gaze Tracking (EGT) sources in virtual, augmented, or mixed reality applications in an Information Handling System (IHS), comprising:
  receiving a first Eye-Gaze Tracking (EGT) vector from a first EGT system coupled to a Head-Mounted Display (HMD);
  receiving a second EGT vector from a second EGT system coupled to an external display of the IHS, wherein the HMD is tethered to the IHS, wherein the first and second weights are calculated based on a telemetry indicator;
  performing a calibration process to generate weights with values indicating priorities using a machine learning algorithm for dynamically combining the first and the second EGT vectors based on a telemetry indicator comprising a measure of at least one of: ambient light, head position, a user distance from the external display, or head orientation;
  dynamically assigning a weight with a value indicating a priority to each of the first and second EGT vectors based on the telemetry indicator;
  calculating a composite EGT vector using a first weight associated with the first EGT system and a second weight associated with the second EGT system, wherein the first and second weights are calculated based on the telemetry indicator;
  at least one of: (i) in response to a value increase in the telemetry indicator, increasing the first weight or decreasing the second weight, or (ii) in response to a value increase in the telemetry indicator, decreasing the first weight or increasing the second weight;
  at least one of: (i) in response to a value decrease in the telemetry indicator, increasing the first weight or decreasing the second weight, or (ii) in response to a value decrease in the telemetry indicator, decreasing the first weight or increasing the second weight; and
  rendering an image of the user's real-world environment on the HMD or the external display, in part, based upon the composite EGT vector.

* * * * *